United States Patent [19]

Koorneef

[11] 3,851,375

[45] Dec. 3, 1974

[54] METHOD OF BONDING TOGETHER MOULDINGS OF SINTERED OXIDIC FERROMAGNETIC MATERIAL

[75] Inventor: Jacob Koorneef, Emmasingel, Eindhoven, Netherlands

[73] Assignee: U.S. Phillips Corporation, New York, N.Y.

[22] Filed: Feb. 11, 1974

[21] Appl. No.: 441,575

Related U.S. Application Data

[63] Continuation of Ser. No. 250,878, May 8, 1972, abandoned.

[52] U.S. Cl............... 29/471.9, 29/472.3, 29/472.9, 29/497, 29/500, 219/10.53, 29/603

[51] Int. Cl............................................. B23k 31/02

[58] Field of Search............ 29/471.9, 472.3, 472.9, 29/497, 503, 603; 219/10.53

[56] References Cited

UNITED STATES PATENTS

| | | | |
|---|---|---|---|
| 3,256,598 | 6/1966 | Kramer et al. | 29/484 |
| 3,605,259 | 9/1971 | Towara et al. | 20/603 |
| 3,668,042 | 6/1972 | Farrard | 29/603 X |
| 3,672,044 | 6/1972 | Toraka et al. | 29/603 |
| 3,672,045 | 6/1972 | Robertson | 29/603 |
| 3,687,650 | 8/1972 | Case et al. | 29/603 X |
| 3,688,056 | 8/1972 | Wisely et al. | 29/603 X |
| 3,706,132 | 12/1972 | Weaver | 29/603 |
| 3,750,274 | 8/1973 | Bealle et al. | 29/603 |
| 3,778,896 | 12/1973 | Bogby | 29/471.9 |
| 3,807,043 | 4/1974 | Hikino et al. | 29/603 |

FOREIGN PATENTS OR APPLICATIONS

| | | | |
|---|---|---|---|
| 6,915,563 | 4/1971 | Netherlands | 29/603 |

*Primary Examiner*—Andrew R. Juhasz
*Assistant Examiner*—Ronald J. Shore
*Attorney, Agent, or Firm*—Frank R. Trifari; Carl P. Steinhauser

[57] ABSTRACT

In manufacturing in particular multi-channel magnetic heads, it is usual to place two ferrite blocks on each other with the interposition of spacing members, to cause glass to flow into the resulting space during a first bonding step, to make grooves in the resulting assembly, and to cement therein filling members with glass during a second bonding step. This method has several drawbacks which are avoided by producing a connection between the ferrite blocks and the spacing members prior to performing further operations, which connection fixes the ferrite blocks relative to each other.

3 Claims, 6 Drawing Figures

METHOD OF BONDING TOGETHER MOULDINGS OF SINTERED OXIDIC FERROMAGNETIC MATERIAL

This is a continuation of application Ser. No. 250,878, filed May 8, 1972, and now abandoned.

The invention relates to a method of bonding mouldings of a sintered oxidic ferromagnetic material.

Several methods of bonding mouldings of a sintered oxidic ferromagnetic material have already been described. In these known methods, an auxiliary layer of metal is first vapour-deposited, sputtered or deposited chemically on the surface to be bonded, after which the thus metallized surfaces are bonded together by means of a solder which is caused to melt. Methods have also been described in which the bonding is carried out without the use of an auxiliary layer. The drawbacks of these methods are that the bonding of the auxiliary layer is not sufficiently strong, and that the deformation of the intermediate layer occuring during melting may be disturbing.

The invention relates to a method in which the drawbacks of the know methods are avoided and is characterized in that a metal foil or spacing member is provided between the mouldings, that the assembly is heated at a temperature below the melting temperature of the metal and under a mechanical pressure of at most 150 kg/sq.cm until the metal and the mouldings are bonded together, the assembly being then cooled and the pressure removed.

In general, a thermo-compression bonding as described above should be carried out in a reducing or an inert atmosphere. It has been found, however, that when Pb/Sn is used as a metal, a good bonding can also be realized in air, provided the pressure is larger than 50 kg/sq.cm.

An embodiment of the method according to the invention is therefore characterized in that Pb/Sn is used as a metal and in that the pressure is between 50 and 150 kg/sq.cm, the temperature is between 145° and 165°C and the duration of the heating is between 1 and 10 minutes.

It has been found that this latter method is particularly readily applicable in the manufacture of socalled potcores.

The invention also relates to a method of manufacturing a magnetic head consisting of at least two mouldings of a sintered oxidic ferromagnetic material which form a magnetic flux path, between which mouldings an operational gap is formed by means of a non-magnetisable material which also bonds the mouldings together. In a known method a gap space is first formed between previously polished faces of two mouldings of a sintered oxidic ferromagnetic material by placing the mouldings one on the other with the interposition of metal spacing members, a quantity of non-magnetisable bonding material being then provided on the outside of the gap space thus formed and heated to such a temperature that it starts flowing and is drawn into the gap space by capillary action, the assembly of mouldings being then cooled and subjected to further mechanical treatments.

Such a method is known from the U.S. patent No. 3,246,383. It is known from this specification to use as a non-magnetisable adhesive vitreous materials such as glass or enamel (but in general other adhesives, such as solder or epoxy resin may also be used), which adhesive is laid against the orifice of the gap space, for example in the form of a fibre or drop before being drawing-in by capillary action.

Upon heating to the flow temperature of the glass or enamel, which is to be understood to mean herein a temperature at which the viscosity of the glass or enamel is so low that capillary drawing in into the gap space takes place in an acceptable period of time, the mouldings and spacing members in the known method should be pressed on each other with a sufficiently large force to prevent the mouldings from moving relative to each other, which occurs rather easily due to the presence of a liquid glass film between the adhering faces and in addition to prevent glass or enamel from creeping between the spacing members and the mouldings. Applying the mechanical pressure required for this purpose, however, should be carried out in such manner that the mouldings, which actually are then ferrite strips, do not bend under the mechanical pressure which is exerted upon them. In many cases this is difficult to realize since as a result of the specific construction of a magnetic head it is often not possible to apply the pressure at the area where it is required to prevent bending. In addition, the pressure should be maintained during the overall period of time which is necessary to heat the glass to the flow temperature, to cause it to flow in and allow it to cool again. Bending of a mould results in a gap which does not have the same thickness everywhere so that a certain reject percentage should be taken into account when manufacturing a number of heads from one set of mouldings.

Moreover, from a point of view of series production, it is unpractical that during the heating process the mouldings must be kept under a mechanical pressure since said process must then be carried out in a compression furnace which in itself is complicated.

A further embodiment of the method according to the invention is characterized in that after the said mouldings have been placed on each other with the interposition of metal spacing members, a rigid connection is produced between the spacing members and the mouldings while using the above-described method.

Since a rigid connection is previously produced in this manner between spacing members and mouldings, as a result of which the mouldings are fixed relative to each other, the mouldings and the spacing members, during the flowing in of the glass, need no longer be held under a mechanical pressure so that the above described problems do not occur. It is notably a great advantage that the operations can be carried out in a normal furnace.

The "thermo-compression bonding" method used in this case cannot only be carried out in a simple manner but is moreover attractive because it is usual in the known method to fire the mouldings before they are laid on each other by heating them for a short period of time at a temperature of, for example 800°C. This heating step may also be used to produce the desired connection between spacing members and mouldings by not heating the separate mouldings but heating under a mechanical pressure the mouldings with inbetween them spacing members.

A further embodiment of the method according to the invention is characterized in that spacing members of an electrically readily conducting metal are used and that the connection with the mouldings is produced by heating the assembly of mouldings and spacing members at such a temperature that the sintered oxidic ferromagnetic material of the mouldings is slightly conductive but at which the material of the spacing members does not yet melt, and by conveying a small electric current from the electrically conductive material of the spacing members to the sintered oxidic ferromagnetic material of the mouldings.

This method which can be carried out at comparatively low temperatures, for example 400 to 500°C, is advantageous in particular when mouldings of a sintered oxidic ferromagnetic material, for example MnZn ferrite, are used the magnetic properties of which could be detrimentally influenced by performing a bonding step at high temperatures.

According to a further embodiment of the method according to the invention, copper, aluminium or nickel is used as the material of the spacing members. In particular the provision of said materials in thin layers is a method known from the manufacture of, for example, transistors and integrated circuits.

According to still a further embodiment of the method according to the invention, the material of the spacing members is provided to the desired thickness on at least one of the mouldings by means of a method of vapour deposition, sputtering or electrode-position.

In manufacturing multi-channel magnetic heads, in which the individual heads are separated from each other by filling members, it is a frequently used method first to cement two mouldings together by means of a high-melting-point glass, as a result of which the gap is formed, and then to make sawcuts in the assembly of mouldings which extend, for example, at right angles to the gap and to cement therein filling members by means of a low-melting-point glass. A high-melting-point glass is to be understood to mean herein a type of glass the softening range of which lies at comparatively high temperatures and a low-melting-point glass is to be understood to mean herein a type of glass the softening range of which lies at comparatively low temperatures.

A drawback of this method is that during the second cementing operation the gap may "run away." During the first cementing operation, some ferrite may actually dissolve in the high melting point glass, as a result of which the latter obtains a lower melting-point. At the temperature at which the second cementing operation takes place, the high-melting-point glass may start softening with the above-described consequence. The same phenomenon may occur when during the second cementing operation high-melting-point glass reacts with low-melting-point glass, which may also result in a melting-point variation.

It has been proposed in the U.S. Pat. No. 3,402,463 to avoid this drawback by clamping the mouldings together instead of cementing them together, prior to making the saw-cuts. After having made the sawcuts, the adhesive may then be provided in one heating step both in the gap and in the space between the walls of the sawcuts and the filling members placed therein. However, the necessity of fixing the mouldings during sawing the mouldings and the flowing of the adhesive presents difficulties in practice.

These difficulties can be avoided if, according to the method of the invention, the mouldings and the spacing members are first rigidly secured together.

Therefore, an embodiment of the method according to the invention is characterized in that after producing the said rigid connection between the spacing members and the mouldings, one or more sawcuts are made in the resulting assembly, the axes of said sawcuts making a desired angle with the boundary faces of the mouldings facing each other, a filling member being then placed in each sawcut and the mouldings being bonded together throughout their length in known manner during one heating step, each spacing member being cemented in its sawcut by means of an adhesive drawn in by capillary action into the gap space and into the spaces between each filling member and the walls of its cut.

Methods of constructing magnetic heads are also known in which the mouldings are first sawn, then positioned relative to each other and subsequently cemented together. In this case also the method according to the invention may advantageously be used. If, actually, in such a construction method the mouldings during the bonding step move relative to each other, the result may be that the head halves are no longer located accurately opposite to each other (so-called track stappening). As already explained above, movement of the mouldings relative to each other is difficult to prevent in the capillary action method as a result of the presence of a liquid film of glass between the adhering faces during the bonding step. The method according to the invention presents the advantage that, by means of a "glassless" bonding method, the mouldings to be bonded together are first secured together by means of the spacing members after which a glass bonding step can be carried out by means of capillary action.

The invention also relates to a magnetic head manufactured by means of any of the above methods.

The invention will be described in greater detail with reference to the drawing which shows an embodiment of the method according to the invention.

Figure 1:
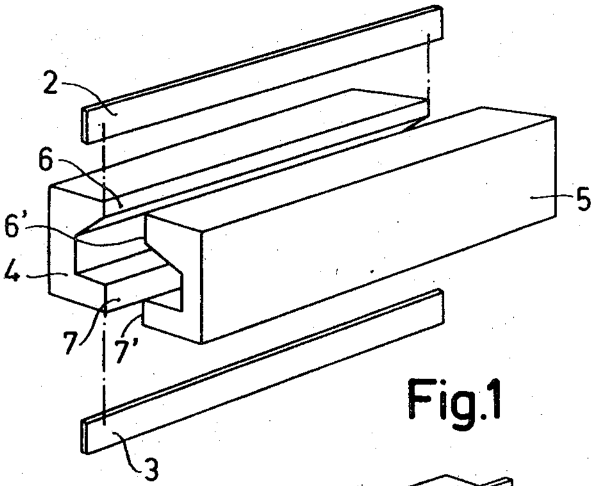
FIG. 1 is a perspective view of two mouldings of ferrite having a given cross-section and facing each other with their polished surfaces.
Figure 2:
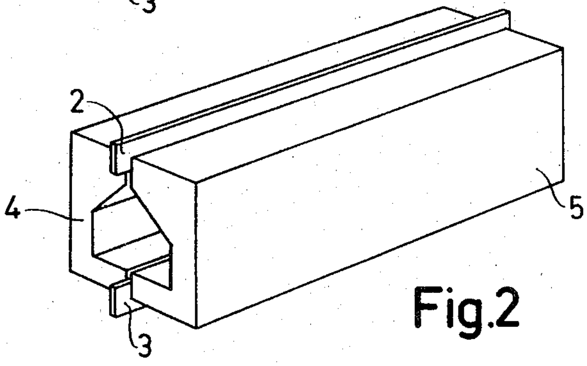
FIG. 2 is a perspective view of the two mouldings of FIG. 1 which are adhered together over their polished surfaces by means of a metal to ceramic bond in which sufficient space has been left between the two polished surfaces to enable a glass bonding by means of capillary action.

FIG. 1 shows a pair of ferrite mouldings 4 and 5. After the interposition of the spacing strips 2 and 3, these mouldings are cemented together as shown in FIG. 2 with their polished surfaces 6 and 7. This may be done, for example, by using nickel spacing strips and heating the assembly under a mechanical pressure which may be, for example, between 20 and 50 kg/sq.cm at a temperature of 750°C to 800°C. In general, the pressure should be between 5 and 100 kg/sq.cm and the temperature below 0.9× the melting temperature (in °C) of the metal used.

Further suitable materials in this connection are the metals: Ni, Cr, Ta, Be, Cu, Ti, V, Al. or metal alloys such as Ag-Cu and Au-Cu. A requirement to be imposed upon the material in question, however, is that the melting temperature must lie above the temperature at which the capillary drawing-in of the gap filling material takes place.

An alternative method which has the advantage that the (metal to ceramic) bond can be produced at comparatively low temperatures is as follows:

Electrically conductive material, for example aluminium, is used for the spacing members 2 and 3. The surfaces 6,6′ and 7,7′ to be bonded are contacted and heated until the insulating material of the mouldings 4 and 5 (for example MnZn ferrite) is slightly conductive. A small positive current is conveyed to the mouldings from the electrically conductive material. The current flows via pressure contacts which are provided on the outer surfaces of the materials. When, for example, a current of a small current density in the order of 10 m.amp./sq.mm is conveyed, the desired bonding is obtained. In the case described here, for example, a bonding can be produced while using a current in the order of 10 microamperes/sq.mm for a few minutes at, for example, 400°C. Bonding methods as described above are known per se from literature.

Figure 3:
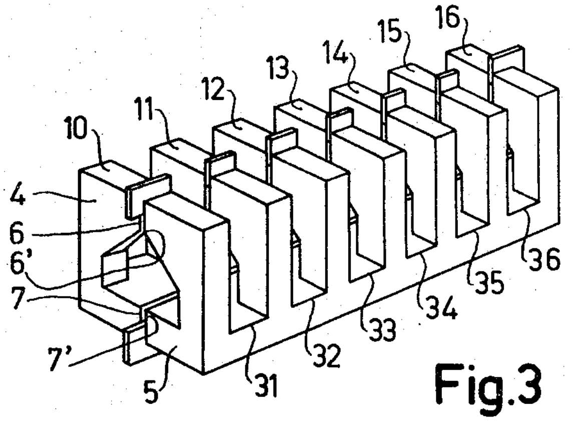
FIG. 3 is a perspective view of the two mouldings shown in FIG. 2 which are secured together and are provided with a number of sawcuts transverse to the bonding surfaces.
Figure 4:
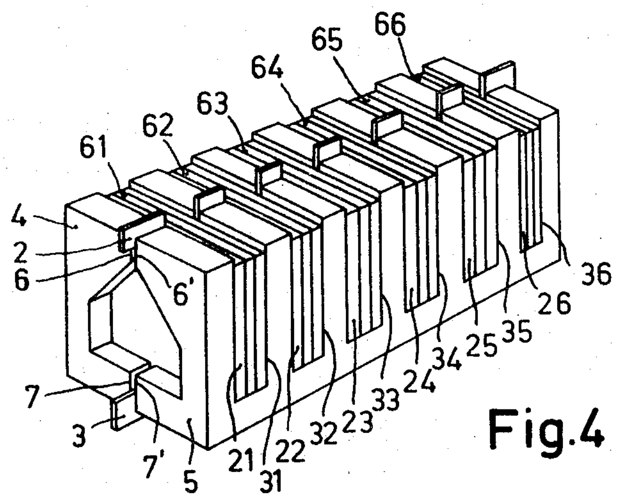
FIG. 4 is a perspective view of the two mouldings secured together having filling members provided in the sawcuts.

As shown in FIG. 3, a number of sawcuts 31, 32, 33, . . . 36 is provided in the resulting assembly transverse to the bonding surfaces 6,6′ and 7,7′, so that a number of preliminary magnetic heads 10, 11, 12 . . . 16 is obtained. In the case shown, the sawcuts 31 . . . 36 have the same mutual distance and the same width and height.

Filling members 21, 22, . . . 26 are placed in the sawcuts 31 to 36. These filling members are preferably manufactured from a non-magnetisable ceramic material having the same mechanical properties as the ferrite of the mouldings, for example barium titanate. In order to obtain a multi-channel magnetic head with low cross-talk between the channels, screening plates 61 . . . 66 of a magnetisable material (for example, ferrite or Mu-metal) may be provided in the filling members 21 . . . 26.

After placing the filling members in the sawcuts, a quantity of glass to be drawn-in by capillary action is laid against the aperture of the spaces remained between the surfaces 6,6′ and 7,7′. The glass may be in the form of a glass fibre. Glass, for example, also in the form of fibres, is also laid on the filling members 21 to 26. The assembly is then heated in a furnace to the flow temperature of the glass used, as a result of which the glass is drawn-in by capillary action in the spaces remained between the bonding surfaces 6,6′ and 7,7′ and between the walls of the sawcuts 31 to 36 and the filling members 21 to 26 placed therein.

Figure 5:
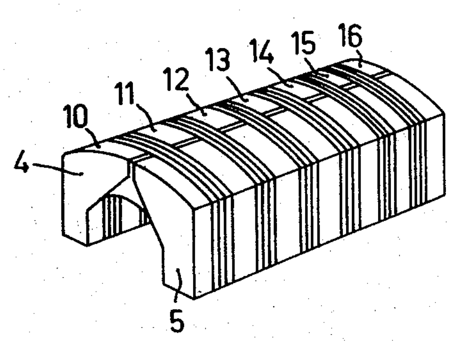
FIG. 5 is a perspective view of the mouldings secured together after a glass bonding operation has been carried out, in which the upper surface has a convex shape which constitutes the operative face and in which the lower part of the assembly has been ground away.
Figure 6:
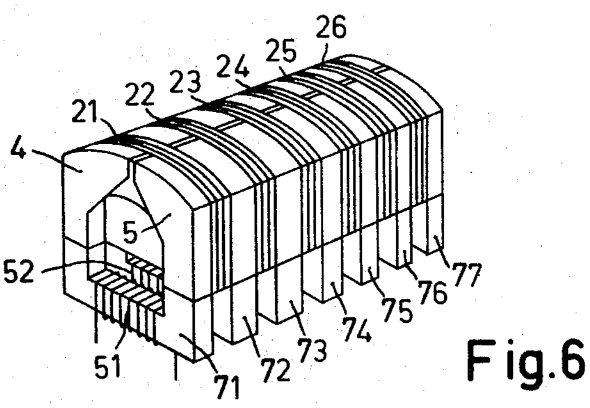
FIG. 6 is a perspective view of a multi-channel magnetic head in which a number of closing yokes provided with electric windings have been provided on the assembly of FIG. 5.

FIG. 5 shows the assembly as it is obtained after cooling. The lower side of the assembly has been ground away according to a plane parallel to the bottom surface of the sawcuts 31 to 36 and on the upper side the part with the spacing strip 2 has been ground away and a convex operational face has been formed by polishing.

The resulting assembly is provided with closing yokes 71 to 77 on which electric windings 51, 52 and so on have been provided so that a multi-channel magnetic head is obtained.

What is claimed is:

1. A method of bonding together a plurality of mouldings of a sintered oxidic ferromagnetic material comprising the steps of:

A. placing a metallic spacing member composed of a lead-tin alloy between said mouldings;

B. heating the resulting assembly of (A) to a temperature between approximately 145°C and 165°C for a period between approximately 1 and 10 minutes;

C. concurrently with the heating step of (B), subjecting said assembly to a mechanical pressure between approximately 50 and 150 kg/sq.cm., until said spacing member and said mouldings are bonded together; and D. cooling said assembly and removing said pressure.

2. In the method of bonding together a plurality of mouldings of sintered oxidic ferromagnetic material by placing a metallic spacing member between said mouldings defining therewith a gap space, thermocompression bonding said mouldings to said spacing member to form a rigid assembly and then placing non-magnetizable bonding material on said assembly on the outside of said gap space and heating said assembly and said bonding material to cause said bonding material to flow into said gap space by capillary action, and thereafter cooling said bonding material to solidify it, the improvement comprising heating the assembly comprising said mouldings and said spacing member to a temperature below the melting temperature of said spacing member and, concurrently with said heating step, subjecting said assembly to a maximum mechanical pressure of approximately 150 kg/sq.cm. until said spacing member and said mouldings are bonded together; cooling said assembly; removing said pressure; placing non-magnetizable bonding material on the outside of said gap space; and reheating said assembly and bonding material to a temperature at which said bonding material melts and flows into said gap space but less than said melting temperature of said spacing member.

3. The method of claim 2, wherein the metallic spacing member is of readily electrically conducting metal, and said bond with the mouldings is produced by heating the assembly to a temperature wherein the sintered oxidic ferromagnetic material of the mouldings becomes slightly electrically conductive, but below the melting point of said spacing member, and then conveying a small electric current from the electrically conductive spacing member to the mouldings.

* * * * *

PO-1050
(5/69)

UNITED STATES PATENT OFFICE
CERTIFICATE OF CORRECTION

Patent No. 3,851,375 Dated December 3, 1974

Inventor(s) JACOB KOORNEEF

It is certified that error appears in the above-identified patent and that said Letters Patent are hereby corrected as shown below:

On the title page please insert the priority application data as referred to in our communication dated July 29, 1974 as follows:

--[30] Foreign Application Priority Data

May 18, 1971 Netherlands....................7106775--.

Signed and sealed this 13th day of May 1975.

(SEAL)
Attest:

RUTH C. MASON
Attesting Officer

C. MARSHALL DANN
Commissioner of Patents
and Trademarks